July 17, 1923. 1,462,191
F. BECK
CERIUM POCKET LIGHTER
Filed Feb. 10, 1921
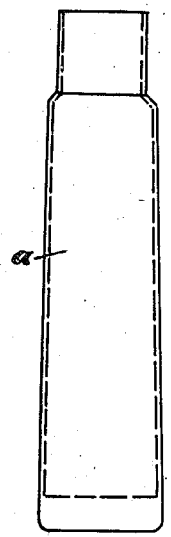
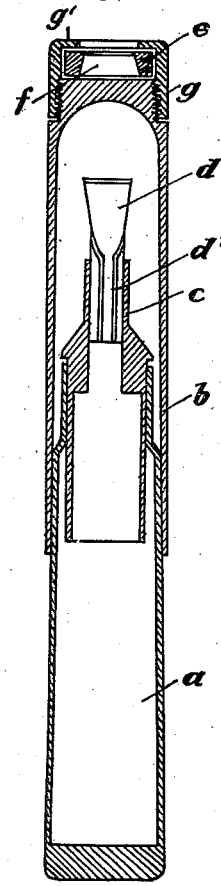
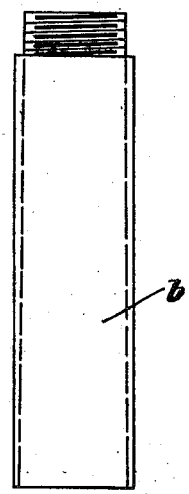
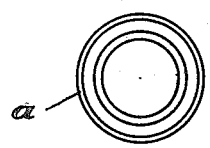
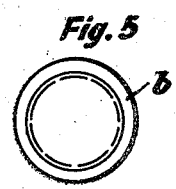
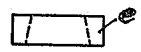
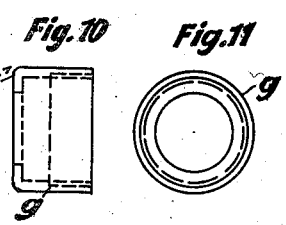
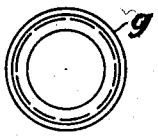
WITTNESSES: INVENTOR:

Patented July 17, 1923.

1,462,191

UNITED STATES PATENT OFFICE.

FRITZ BECK, OF NUREMBERG, GERMANY.

CERIUM POCKET LIGHTER.

Application filed February 10, 1921. Serial No. 444,065.

(GRANTED UNDER THE PROVISIONS OF THE ACT OF MARCH 3, 1921, 41 STAT. L., 1313.)

*To all whom it may concern:*

Be it known that I, FRITZ BECK, a citizen of the German Republic, residing at Nuremberg, Germany, have invented certain new and useful Improvements in Cerium Pocket Lighters, for which I have filed application in Germany, March 24, 1919, Patent Number 342049, of which the following is a specification.

This invention relates to a cerium pocket lighter which differs from the pocket lighters of the same type and of known construction in so far that the cerium is countersunk and removably mounted in the end face of the tubular cover, and that the friction device has the shape of a large knife mounted by means of an annular shaft in the wick tube seated upon the fuel reservoir.

In order that the invention may be clearly understood, I shall proceed to describe the same with reference to the construction shown by way of example in the accompanying drawing, wherein:—

Fig. 1 shows the pocket lighter in axial section.

Fig. 2 is a front elevation of the fuel reservoir.

Fig. 3 is a plan view of the same.

Figs. 4 and 5 show the tubular cover in side elevation and in plan view respectively.

Figs. 6 and 7 are a side elevation and a plan view respectively of the mounting of the cerium.

Figs. 8 and 9 represent the cerium in side elevation and in plan view respectively.

Figs. 10 and 11 show the screw cap for fixing the mounting of the cerium in side elevation and in plan view respectively.

Figs. 12, 13 and 14 show the friction device in different views.

Figs. 15 and 16 are respectively a side elevation and a view from below of the wick holder.

The fuel reservoir $a$ consists of a conical tube closed at the lower end by a bottom plate and at the upper end by the wick holder $c$. In the wick holder $c$ the knife $d$ of peculiar shape is mounted whose cutting edge is preferably situated transversely to the axis of the wick holder or slightly inclined with regard to the same. The knife $d$ has an annular shaft $d'$ which fits the boring for the wick and which encloses the wick so that the knife is securely mounted in the wick holder $c$.

A sleeve $b$ whose conicity corresponds with the conicity of the fuel reservoir $a$ and which is closed at the upper end is mounted upon said fuel reservoir; it has threads designed to receive the screw cap $g$. The bottom of the screw cap has a circular opening so that it forms an inwardly projecting ring-shaped bead $g'$. Between the bead $g'$ and the end face of the sleeve $b$ the mounting for the cerium is located which consists of a circular disk $e$ having a rectangular opening $e'$. Two opposite edges of the opening $e'$ are bevelled downwardly so that a dove-tailed recess is formed in which the cerium piece $f$ is inserted which has two bevelled side faces $f'$.

Owing to the peculiar construction of the sleeve described, the cerium piece is countersunk and removable.

The pocket lighter presents an absolutely smooth outer surface and is consequently to be stored easily in a pocket.

After the cap $g$ has been unscrewed the mounting $e$ with the cerium piece $f$ drops out. The cerium piece can be removed by a slight pressure from its mounting and a new piece of cerium can be inserted. The fixation is effected in an equally simple manner but in inverse succession.

Owing to the conical shape of the fuel reservoir and of the sleeve a gas tight joint is effected between said two parts so that no loss of fuel can occur. To make the pocket lighter ready for use it is merely necessary to remove the sleeve $b$ and to rub the knife $d$ along the opening $e'$ over the cerium $f$ to produce strong sparks which light the wick. The wick holder $c$ remains in the fuel reservoir so that no fuel can be lost even when the pocket lighter is being used.

The comparatively large cutting edge $d$ rubs over the entire width of the cerium piece but does not penetrate into the same, so that no cerium is wasted. When the cutting edge has become blunt it can be easily sharpened or the knife can be replaced by a new knife.

The benzine reservoir forms a handy handle, so that the knife is better guided in the slot of recess $e'$ than the thin friction member of the pocket lighters of known construction, with which it happens frequently that the knife slips off the cerium unless the lighter is handled carefully.

The improved construction of the pocket lighter, which could evidently be oval, flat edged or of other shape, offers the further advantage that the wick can be easily replaced.

I claim:—

1. A pocket lighter of the type described in which the ignition means is arranged in the enclosing cap which fits over the burner piece or tinder holder comprising in combination an enclosing cap, a striker of the shape of a knife with broad edged blade, an ignition metal piece of rectangular shape having two side faces bevelled from below upward, a ring removably inserted in said cap having a rectangular opening and two side faces inclined so that they fit on the inclined side faces of said ignition metal piece designed to securely hold said ignition metal piece and to serve as guide for said striker.

2. In a pocket lighter of the type described the combination of an enclosing cap screw threaded at its upper end, a striker of the shape of a knife with broad edged blade located in said enclosing cap, an ignition metal piece of rectangular shape having two side faces bevelled from below upward, a ring removably inserted in said cap having a rectangular opening and two side faces inclined so that they fit on the inclined side faces of said ignition metal piece designed to securely hold said ignition metal piece and to serve as guide for said striker, and a screw cap screwed upon said enclosing cap to hold the ring in position and having a rectangular opening in the top plate which is smaller than said ring.

In testimony whereof I affix my signature in presence of two witnesses.

FRITZ BECK.

Witnesses:
 CONRAD SITZ,
 KONRAD ENGELHARDT.